UNITED STATES PATENT OFFICE.

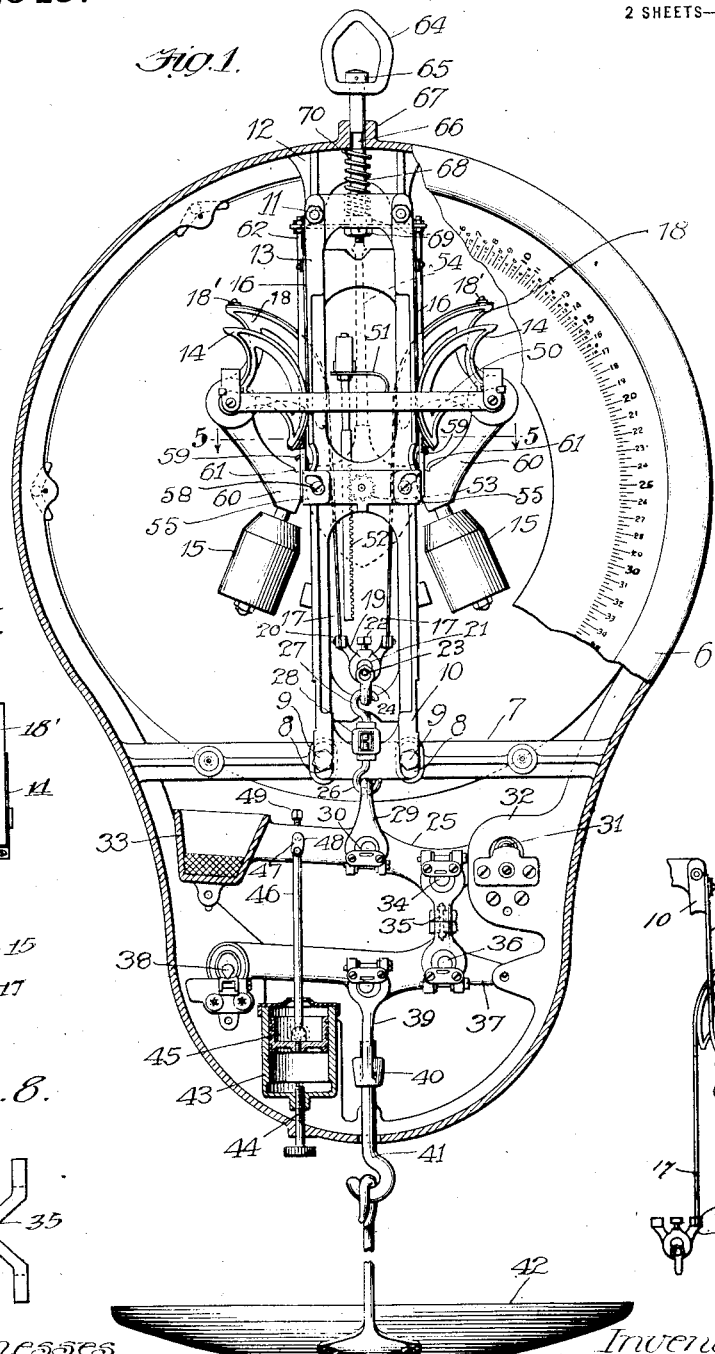
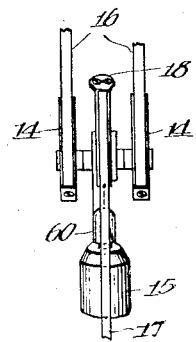
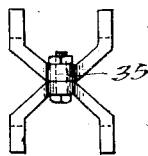
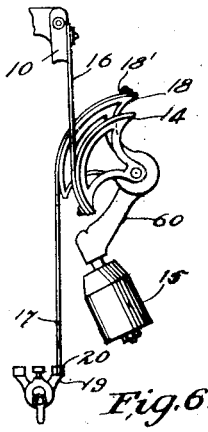

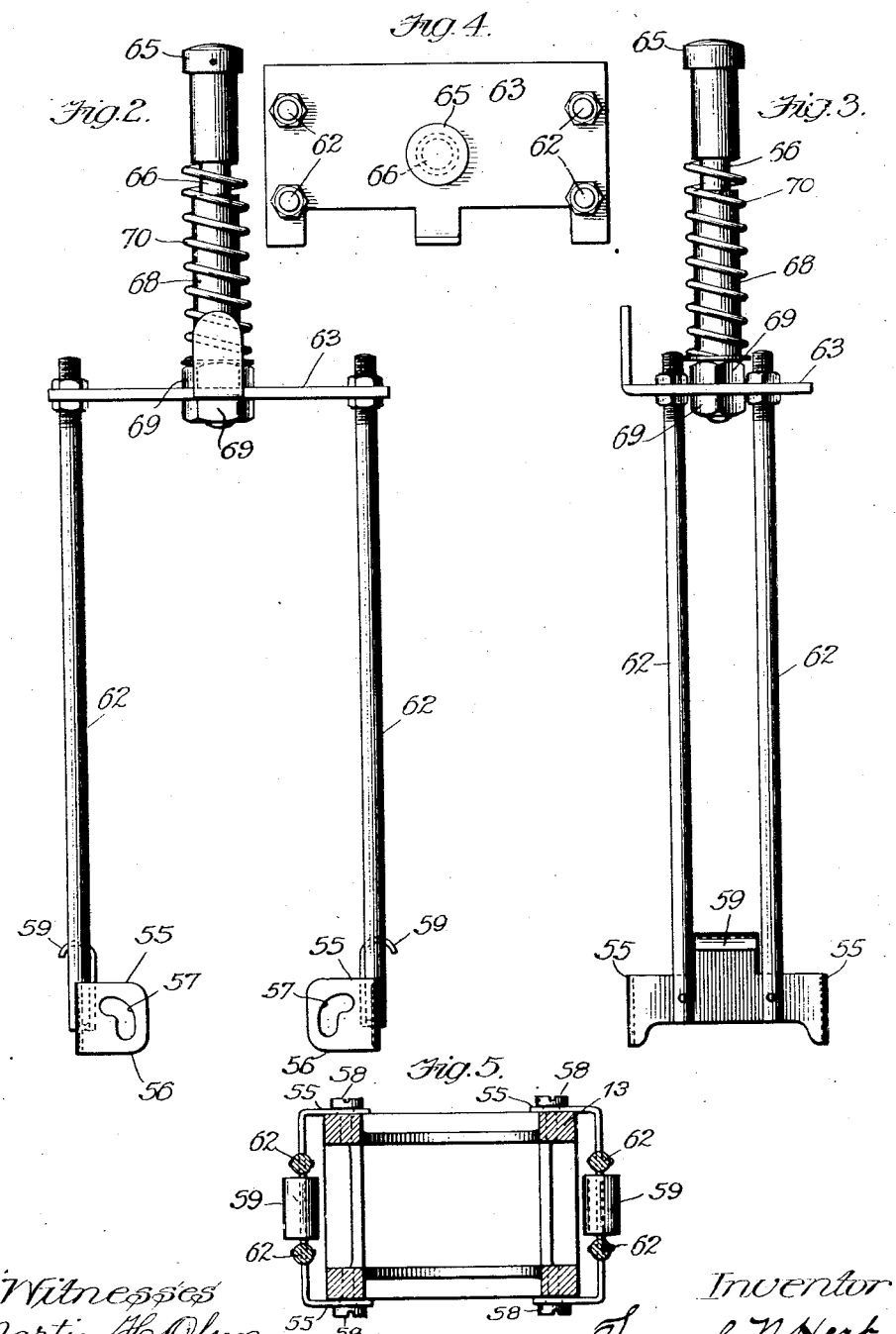

SAMUEL N. HERT, OF TOLEDO, OHIO, ASSIGNOR TO TOLEDO SCALE COMPANY, OF JERSEY CITY, NEW JERSEY, A CORPORATION OF NEW JERSEY.

WEIGHING-SCALE.

1,267,549.  Specification of Letters Patent.  Patented May 28, 1918.

Application filed July 22, 1914. Serial No. 852,384.

*To all whom it may concern:*

Be it known that I, SAMUEL N. HERT, a citizen of the United States, residing at Toledo, county of Lucas, and State of Ohio, have invented certain new and useful Improvements in Weighing-Scales, of which the following is a specification.

My invention relates more particularly to hanging scales, adapted to be supported from a hook or the like, in which a pendulum or a pair of pendulums constitutes the counterbalance or offsetting means for the load upon the scale pan. In preparing scales of this character for transportation it is advisable to pack or otherwise secure the movable parts from relative movement due to shocks or jars or placing the scales in an improper position. It is particularly desirable to prevent such movement upon the part of the pendulum or pendulums. Prior to my invention a device had been put upon pendulum scales for this purpose which consists in a part which can be moved under hand control into and out of engagement with the pendulum or pendulums and when in engagement therewith locks them in position, but when moved away therefrom frees the pendulum and does not interfere with their full movement. My improvement relates to a device of this general character applicable to hanging scales in which, however, the locking means is automatically applied by the very act of removing the scale from its support. In the accompanying drawings I have shown and in the following specification described a preferred form of scale embodying my invention. It is to be understood, however, that the specific disclosure is for the purpose of exemplification only and that the scope of the invention is defined in the following claims, in which I have endeavored to distinguish it from the prior art so far as known to me without, however, relinquishing or abandoning any portion thereof.

Referring now to the accompanying drawings, Figure 1 is a front elevation of a preferred form of scale embodying my improvement, the casing however and certain parts of the interior mechanism being shown partially in section; Fig. 2 is a front elevation upon an enlarged scale of one of the elements of the scale to which my invention relates; Figs. 3 and 4 are an end elevation and top plan respectively of the same element of the scale, Fig. 5 is a horizontal section on the line 5—5 of Fig. 1, Figs. 6, 7 and 8 show details of the pendulum mechanism.

The casing 6 may be of any suitable character providing the necessary support and protection for the scale parts and provided with a dial as indicated in Fig. 1. The front plate is removably secured by screws or otherwise to the casing which forms the body of the casing and the latter is formed with a cross piece 7 which supports the counterbalance mechanism of the scale and the means by which the indicating hand is driven. The cross piece 7 is provided near its center with a pair of vertical slots 8 which are spaced apart to receive the bolts 9 in the lower ends of the four columns 10 of the frame casting which supports the counterbalance mechanism. The upper ends of said columns or posts are bolted as at 11 to depending brackets 12 formed on the casing. It may be said here that the purpose of the slots in the cross piece 7 is to permit such slight adjustment as may be necessary, as for example, by reason of any slight differences in the length of the frame casting. The outer lateral faces 13 of the posts of the frame casting form bearings for segments 14 which support the pendulums 15, there being two segments for each pendulum spaced apart and resting against the respective posts on that side of the framework. As the segments 14 of each pair are substantially identical, only the segments on the forward side of the pendulum are shown in the drawings. Each pendulum element comprising said two segments is supported by straps 16 secured to said segments respectively at the lower ends of their arcuate faces and attached at their upper ends to the upper ends of the faces of the corresponding posts. It will thus be seen that the pendulum structures or units as the pendulums swing outward, roll upward upon the frame structure, the segments rolling upon the straps and the latter resting against the corresponding posts. Intermediate the two segments on each pendulum, above described, is a third segment 18 of greater radius which projects between the front and rear posts on that side of the frame structure and carries a ribbon 17 attached to its upper end as at 18', the straps together suspending from their lower ends an equalizer casting 19 which is secured thereto at 20. The casting 19 is counterbored from front to rear at 21, and a cylinder of hardened metal inserted in this bore and clamped in position by a screw 22 and the projecting ends of said cylinder are formed with knife edges 23 which together support a yoke or stirrup 24. From the yoke a connection is made to a beam 25 by means of a pair of screw hooks 26—27 connected by a union 28 so as to permit of necessary adjustment, the upper hook 27 engaging the stirrup 24 and the lower hook 26 engaging a stirrup 29, the limbs of which span the beam 25 and are pivoted thereto by knife edges 30 or in any other suitable manner. The beam 25 is likewise pivoted at 31 between the fins or webs 32 projecting from the casing and carries at its outer end a shot box 33 or equivalent sealing means. Intermediate the fulcrum point 31 of the beam and the point of attachment of the connections to the counterbalancing mechanism, the beam 25 is provided with projecting knives 34 which receive bearing blocks carried in seats upon the upper ends of a bifurcated link 35. The lower end of this link is similarly formed to engage knives 36 projecting from a second beam 37 and if desired and as shown said link 35 may be formed in two sections with any suitable or well-known adjusting means between them. The beam 37, above mentioned, is fulcrumed at 38 in any usual or suitable manner on webs connected to the casings and intermediate its fulcrum point and the point of attachment of the link 35 supports a link 39 bifurcated at its upper end and supported from the beam 37 in the manner described in connection with the link 35. The link 39 is formed with a nut 40 which receives the end of a screw hook 41 which in turn supports the scale pan 42. A dashpot 43 is adjustably connected to the casing by thumb-screw 44, the piston 45 of the dashpot being connected to the lever 25 by a rod 46 pivoted at its upper end to a crank arm 47 projecting from or forming part of a bolt 48 angularly adjustabale in the arm 25 and secured by means of a set screw 49.

Each pendulum and the segments connected thereto are mounted upon a short cross rod and are angularly adjustable relative to each other about the same, but subject to this adjustment are rigidly connected together, and the two pendulum structures on respectively opposite sides of the frame are connected by a cross bar 50 which is connected by a spring 51 with a depending rack 52. The rack engages a pinion 53 upon the shaft of the pointer 54 (dotted lines, Fig. 1) so that the latter is driven by the rack.

Normally the scale is sealed or counterweighted so that it is in equilibrium with the parts in the position shown in Fig. 1. When an article to be weighed is placed upon the scale pan its weight is communicated through the lever 37, link 35, lever 25, link 28, equalizer 19, ribbons 17 and segments 18 to the pendulum castings whereby the pendulums are thrown outward and upward until the load upon the scale pan is counterbalanced, the pendulum structures in the meantime moving bodily upward along the frame.

In order to lock the pendulums against movement when the scale is to be transported or is for any reason moved from its support, I provide a pair of U-shaped yoke pieces 55 which embrace the sides of the frame and the end members 56 of which extend upon the front and rear faces of the frame and are provided with curved slots 57 through which loosely extend screws 58 attached to the frame. The yoke pieces are thus permitted a slight travel in a curved path which is controlled by said slots. Upon these yoke pieces are mounted hooks 59 which project outwardly therefrom and above the knees 60 of the pendulums which are notched at 61 to receive the hooks when the yoke pieces are in their lowered position. The yoke pieces are connected by pairs of rods 62 to a cross head 63 extending through the upper end of the rectangular frame and vertically movable with reference thereto. The eye 64 for supporting the scale from a hook or other projection embraces the upper end of a headed rod 65 which is reduced at 66 and extends through a boss 67 formed on the casing into a sleeve 68 and through the head 63 to which it is secured by nuts 69 on opposite sides thereof. Surrounding the sleeve 68 and compressed between the same and the nuts 69 upon the cross head 63 is a spring 70.

The tendency of the spring obviously is to force the head 63 downward with relation to the casing and to cause the hooks 59 to engage the pendulums and if the latter are in their inner position the hooks will be received into the notches 61 therein. When, however, the scale is supported from the eye 64 the weight of the casing and associated parts overcomes the resistance of the spring 70 and causes the body of the construction to move downward with reference to the head 63 and hooks 59 so that the screws 58 ride downward in the slots 57 and throw the yokes 55 outward, the rods 62 being sufficiently resilient for this effect. When it is desired to remove the scale from its hook the scale pan is first detached which permits the pendulum to assume their innermost position, in which they are in the paths of the respective hooks. When, therefore, the scale casing is raised to remove it from the support the spring 70 forces the hooks downward and inward so that they engage the pendulums and maintain the latter in their inner position until the scale is again suspended by the eye.

By my improvement, therefore, a scale is provided in which the movable parts, or more specifically speaking, the counterbalance pendulums are automatically locked in position by the act of removing the scale from its support. It is obvious that other forms of support and other forms of locking means could be employed without departing from my invention which in its broader aspect consists in so connecting up the support and the locking means that when the scale is otherwise supported the locking means are in engagement with the levers or other movable elements of the scale but when the scale is supported by said support the locking means is automatically removed from engagement with such movable parts.

I claim.

1. In a weighing scale comprising a casing, a load receiver and load-counterbalancing means, means for suspending the casing, means for locking a movable part of the scale, connected to said suspending means, and a spring normally forcing the locking means into engagement with the part to be locked.

2. In a weighing scale comprising a casing, a load receptacle and load-counterbalancing means, a support for the scale vertically movable with reference thereto, a locking means for a movable part of the scale connected to said support and a spring engaging the locking means and normally forcing it into engagement with the movable part.

3. In a weighing scale comprising a casing, a load receiver and a pendulum for counterbalancing the load, means for locking the pendulum, a means for hanging the scale vertically movable with reference to the casing and a connection between the pendulum locking means and the hanging means.

4. In a weighing scale and in combination with the casing, load receptacle and load offsetting means comprising a pair of pendulums, locking means movable relative to the casing and pendulums for engaging the latter, means for suspending the scale including a rod vertically reciprocable through the casing and connected to the locking means and a spring for forcing the pendulum locking means into engagement therewith.

5. In a weighing scale having a casing, a load receiver, a pair of pendulums mounted in the casing and connected to the load receiver, a pair of locking members movable into and out of engagement with the pendulums, a cross head, resilient means connecting the locking members with the cross head, a suspending means, a rod connecting the cross head and suspending means and a spring intermediate the rod and casing.

6. In a weighing scale, a casing, a load receptacle, load-offsetting means within the casing, a vertically movable frame within the casing, a suspending means tending to move the frame downward with respect to the casing, a connection from said frame for supporting the scale, and locking means mounted on the frame and adapted to engage the counterbalance means.

7. In a weighing scale, a casing, a pendulum mounted in the casing, a load receptacle operatively connected to the pendulum whereby the pendulum will offset a load on said receptacle, a vertically movable frame in the casing, supporting means connected to said frame, a spring between said supporting means and casing, and a hook on the frame adapted to engage the pendulum to lock the same.

8. In a weighing scale, a casing, a pair of pendulums mounted in the casing, a load receiver operatively connected to the pendulums, a frame vertically movable in the casing, a suspending means attached to the frame, a spring intermediate the casing and frame, rods depending from the frame and hooks carried by said rods and adapted to engage and lock the pendulums.

9. In a weighing scale, a casing, a vertical frame mounted in the casing, a pair of pendulums supported on the frame, a load receiver, connections from the load receiver to the pendulums, a frame vertically movable relatively to the frame, a suspension means connected to the frame, a spring intermediate the frame and casing, resilient rods connected to the frame, and hooks supported by the rods and adapted to engage the pendulums.

10. In a weighing scale, a casing, a vertical frame mounted therein, a pair of pendulums mounted on the vertical frame, a load receptacle, a connection from the load receptacle to said pendulums, a pair of yokes slidably mounted upon the frame, hooks carried by the yokes, a cross-head connections between the yokes and cross-head whereby the movement of the cross-head operates the yokes and the hooks carried thereby to cause the latter to engage the pendulums.

11. In a weighing scale, a casing, a vertical frame mounted therein, a pair of pendulums mounted upon the frame, a load receiver, connections between the load receiver and pendulums, a vertically movable cross head, a suspension device attached to the cross head, a spring between the cross head and casing tending to force the former downwardly with respect to the casing, and a pair of hooks carried by the cross head and adapted to engage the pendulums.

12. In a weighing scale of the class described, a casing, a vertical frame in the casing, a pair of pendulums mounted on the vertical frame, a load receiver, connections between the load receiver and the pendulums whereby the latter are adapted to offset a load upon the receiver, a cross head vertically movable with respect to the frame, a suspension device attached to the cross head, a spring intermediate the cross head and casing, a pair of yokes slidingly mounted on the frame and hooks mounted upon the yokes and adapted to engage the respective pendulums to lock the same.

13. In a weighing scale, a casing, a frame in the casing, a pair of pendulums mounted in the frame, a load receiver, connections between the load receiver and pendulums whereby the latter are adapted to offset the weight of a load in the receiver, a cross head vertically movable with respect to the frame, a suspending means attached to the cross head, a spring intermediate the cross head and casing, a pair of yokes each having a pin-and-slot engagement with the frame whereby the yokes are guided, and connections between the yokes and cross head whereby the movement of the latter operates the former.

14. In a weighing scale, a casing, an upright frame mounted in the casing, a pair of pendulums each mounted upon the frame by means of a pair of segments and straps, the latter connected to the segments and frame, a load receiver, connections from the load receiver to the pendulums whereby the latter are adapted to offset the weight of a load in the receptacle, a pair of sliding yokes mounted upon the frame upon opposite sides thereof, said yokes having pin-and-slot connections with said frame, hooks carried by said yokes and adapted to engage the pendulums to lock the same, a cross head, resilient rods connecting the cross head and yokes, a suspending device attached to the cross head and extending through the casing, and a spring intermediate the casing and cross head.

15. In a weighing scale, load-offsetting means, a locking device having a normal bias to engage the load-offsetting means and lock the same against movement, and means for disengaging the locking device from the load-offsetting means.

16. In a weighing scale, pendulum load-offsetting means, a locking device having a normal bias to engage the load-offsetting means and lock the pendulum against movement, and means for disengaging the locking device from the load-offsetting means.

17. In a weighing scale, load-offsetting means including a pair of pendulums, a locking device having a normal bias to move into positive engagement with the pendulums and lock both pendulums against movement, and means for disengaging the locking device from the load-offsetting means.

18. In a hanging scale, pendulum load-offsetting means, means for suspending the scale, locking means for holding the load-offsetting means in an inoperative position and connections between the suspending means and the locking means whereby the pendulums are automatically unlocked when the scale is hung by said suspending means, and automatically locked when the scale is removed from its suspended position.

19. In a hanging scale, load-offsetting means comprising a pair of oppositely-disposed pendulums, means for suspending the scale, locking means for holding the load-offsetting means in an inoperative position, and connections between the suspending means and the locking means whereby the pendulums are automatically unlocked when the scale is hung by said suspending means, and automatically locked when the scale is removed from its suspended position.

SAMUEL N. HERT.

Witnesses:
H. S. BERGEN,
C. W. FESSENDEN.